United States Patent
Huwiler et al.

(10) Patent No.: US 11,828,384 B2
(45) Date of Patent: Nov. 28, 2023

(54) METHOD FOR OPERATING A VALVE, ASSOCIATED ELECTRONIC CONTROL UNIT, AND VALVE DRIVE

(71) Applicant: Siemens Schweiz AG, Zürich (CH)

(72) Inventors: Adrian Huwiler, Honau (CH); Wolfgang Huber, Hünenberg See (CH); Rolf Kunzmann, Gernsbach (DE); Karl-Heinz Petry, Reichenburg (CH)

(73) Assignee: SIEMENS SCHWEIZ AG, Zurich (CH)

( * ) Notice: Subject to any disclaimer, the term of this patent is extended or adjusted under 35 U.S.C. 154(b) by 450 days.

(21) Appl. No.: 17/288,801

(22) PCT Filed: Sep. 17, 2019

(86) PCT No.: PCT/EP2019/074828
§ 371 (c)(1),
(2) Date: Apr. 26, 2021

(87) PCT Pub. No.: WO2020/088831
PCT Pub. Date: May 7, 2020

(65) Prior Publication Data
US 2022/0003335 A1 Jan. 6, 2022

(30) Foreign Application Priority Data
Oct. 29, 2018 (EP) .................................. 18203215

(51) Int. Cl.
*F16K 37/00* (2006.01)
*G05D 7/06* (2006.01)

(52) U.S. Cl.
CPC ...... *F16K 37/0083* (2013.01); *F16K 37/0091* (2013.01); *G05D 7/0635* (2013.01)

(58) Field of Classification Search
None
See application file for complete search history.

(56) References Cited

U.S. PATENT DOCUMENTS

| 2009/0240376 A1 | 9/2009 | Elshafei ....................... 700/282 |
| 2011/0114304 A1 | 5/2011 | Keller ........................... 165/276 |

FOREIGN PATENT DOCUMENTS

| DE | 4019503 A1 | 1/1992 | ............. F24D 19/10 |
| EP | 0 264 032 | 4/1988 | ............. G05B 11/30 |

(Continued)

OTHER PUBLICATIONS

Search Report for International Application No. PCT/EP2019/074828, 10 pages, dated Feb. 6, 2020.

*Primary Examiner* — Sean Shechtman
(74) *Attorney, Agent, or Firm* — Slayden Grubert Beard PLLC

(57) ABSTRACT

Various embodiments of the teachings herein include a method for operating a valve comprising: determining a nonlinear characteristic curve function indicating a required relationship between a valve opening position and flow of a fluid; storing the function in an ECU; and using the function to set the valve opening position with a control signal indicating a target flow. The function is calculated automatically using a parameter value, with an analytic function, or by interpolation with specified supporting values by a user. The function comprises an inverse function based on a characteristic curve for a heat exchanger and a target function. The curve for the heat exchanger indicates a relationship between a heating power or a cooling power and the flow of a fluid. The target function indicates a relationship between the heating power or the cooling power of the heat exchanger based on the valve opening position. The char- (Continued)

acteristic curve for the heat exchanger depends on the same parameter value as the characteristic curve function.

11 Claims, 3 Drawing Sheets

(56) References Cited

FOREIGN PATENT DOCUMENTS

| WO | 95 06276 | 3/1995 | ............ G05D 16/00 |
| WO | 2010/010092 A2 | 1/2010 | ............ F24D 19/10 | ic curve, as is the case for heat-related loads for example,
METHOD FOR OPERATING A VALVE, ASSOCIATED ELECTRONIC CONTROL UNIT, AND VALVE DRIVE

CROSS-REFERENCE TO RELATED APPLICATIONS

This application is a U.S. National Stage Application of International Application No. PCT/EP2019/074828 filed Sep. 17, 2019, which designates the United States of America, and claims priority to EP Application No. 18203215.1 filed Oct. 29, 2018, the contents of which are hereby incorporated by reference in their entirety.

TECHNICAL FIELD

The present disclosure relates to valves. Various embodiments of the teachings herein include methods for operating a valve having an electronically activated drive unit, electronic control units, and/or valve drives.

BACKGROUND

A system for controlling flow properties is described in US 2009/0240376 A1, which allows a user to selectively alter the inherent flow properties of a fluid transfer system containing a flow sequence regulator and a positioning regulator for a regulating valve. The system contains a programmable flow control system with an input adapted for receiving an input signal from the flow process control system. The programmable flow regulation system selectively modifies the input signals generated by the flow process control system in accordance with user-definable flow parameters. An output is connected to the programmable flow regulator, with the output being adapted for transmitting output signals to the positioning regulator of the control valve (and the valve connected to same). A user interface is provided for inputting the user-defined flow parameters into the programmable flow regulator, to adapt the input signal to the user-defined flow parameters.

A method for regulating flow-dependent controlled variables is described in EP 0 264 032 A2. In this method, regulation of flow-dependent controlled variables, such as pressure for example, is effected by using a positioning valve whose throttle body is altered in its lift position by a positioning cylinder connected to a hydraulic control circuit, through the feeding or removing of hydraulic fluid. Regarding the throttle body lift, specific characteristic curves are produced of the control deviation, the time integral and the time differential for the said control deviation, and stored electronically in the form of points on the characteristic curves or coefficients of analytical functions.

International patent application WO 2010/010092 A2 describes a method for hydraulic compensation and regulation of a heating and cooling installation, and also a compensating and regulating valve for same.

The German application DE 40 19 503 A1 describes a facility for controlling the positioning valve of a central heating installation, having an electrically controllable positioning facility for operating the positioning valve and also an electric control facility for controlling the positioning facility. The control facility has a memory in which a valve lift/flow correction characteristic curve is stored. The control facility controls the positioning facility such that the positioning facility sets the valve lift of the valve in line with a specified flow.

SUMMARY

The teachings of the present disclosure include simple methods of using a valve with a particularly simply constructed valve tappet, and with a selectable characteristic curve. It should be possible in particular to take account of a parameter influencing the entire course of the characteristic curve, as is the case for heat-related loads for example, in particular in the case of heat-related loads in heating/cooling temperature control loops or temperature control systems of such type. For example, method for operating a valve (100), containing the steps:

determining or specifying a nonlinear characteristic curve function (230), which indicates a required relationship between a valve opening position and the flow of a fluid through the valve (100), storing the characteristic curve function (230) in an electronic control unit (104), utilizing the stored characteristic curve function (230) to set the valve opening position (H) of the valve (100) depending on a control signal (105), which indicates a target flow through the valve (100), wherein the characteristic curve function (230) is calculated automatically by means of a parameter value a, by means of an analytic function, or by interpolation with specified supporting values, which is or are specified by a user of the valve (100), characterized in that the characteristic curve function (230) is an inverse function (230) determined from a characteristic curve (220) for a heat exchanger (110) and from a target function (210), the characteristic curve (230) for the heat exchanger (110) indicates the relationship between the heating power or cooling power and the flow of a liquid or a gas through the heat exchanger (110), the target function (210) indicates the relationship between the heating power or cooling power of the heat exchanger (110) depending on the valve opening position (H) of the valve (100), the target function (210) is linear, and the characteristic curve (220) for the heat exchanger (110) can be calculated with the aid of the same parameter value (a) as the specified or determined characteristic curve function (230).

In some embodiments, a nonlinear mechanical characteristic curve of the valve (100) is taken into account in defining the inverse function (230), wherein the valve (100) is in particular a ball valve, a throttle valve, or a rotary globe valve.

In some embodiments, the characteristic curve function (230) is specified by $v=q/(q+(1-q)/a)$, where q is the normalized cooling power or heating power of the heat exchanger (110), preferably in the range 0 to 1, and preferably unit-less, where v is the normalized flow through the valve (100) and through the heat exchanger (110), preferably in the range 0 to 1, and may be unit-less, and where a indicates a characteristic value for modeling a characteristic curve for a, or respectively the, heat exchanger (110), which is defined in particular by the inflow temperature and the outflow temperature of a fluid flowing through the heat exchanger (110), where a lies in the range 0 to 1, and may be unit-less.

In some embodiments, the characteristic curve function (230) is stored in an electronic device (104), preferably in an electronic memory device (M1), in particular in the form of a calculation instruction for an automatically executed program (P1), or in the form of a table of values in which valve opening positions (H) belonging to flow values, or flow values belonging to valve opening positions (H) are stored, in particular normalized valve opening positions (H) and normalized valve opening positions (H).

In some embodiments, the characteristic curve (230) is scaled, wherein the externally specified working range of the valve (100) is less than 100 percent of the potential valve opening position (H) of the valve (100), in particular less than 75 percent or less than 50 percent, wherein the actual control value is calculated from an externally specified control value (105), in which a percentage corresponding to the externally specified control value (105) with reference to a mechanically possible maximum valve opening position (S100) is multiplied by a percentage corresponding to the externally specified control value (105) with reference to a specified actually used maximum valve opening position (S75).

In some embodiments, the parameter (a) is specified by a user of the valve (100), in particular while utilizing an app that communicates with a server (150), wherein the parameter (a) is sent from the server (150) to the control unit (104) by way of a download of the firmware of an electronic control unit (104) for activating a drive unit (102) of the valve (100), over a data transmission network (160).

In some embodiments, the method is carried out, in particular automatically, at least two times per year or per day for the same valve with mutually differing parameter values.

As another example, some embodiments include an electronic control unit (104), containing: at least one memory unit (M1), in which a program with commands for activating at least one valve (100) is stored, at least one processor (P1) designed to load the program from the memory unit (M1) and process commands of the program, wherein the control unit (104) is designed to activate precisely one drive unit (102) of a valve (100) depending on a control signal (105), or wherein the control unit (104) is designed, in the form of a central or higher-level control unit (104), to activate multiple valves (100) with the aid of multiple control signals (105), characterized in that the control unit (104) is suitable for carrying out the method as described herein.

As another example, some embodiments include a valve drive (1000) for fitting to a valve (100) for the purpose of setting a valve lift (H), having a drive unit (102), in particular a magnetic drive unit, an electromechanical drive unit, an electrohydraulic drive unit, or a pneumatic drive unit, and a control unit (104) connected for signaling or data purposes to the drive unit (102) as described herein.

In some embodiments, the valve (100) has a linear mechanical characteristic curve, wherein the valve (100) is in particular a globe valve (100) or a slide valve with a valve tappet (410, 420) of geometrically simple construction, preferably a globe valve (100) with a valve tappet in the form of a cylindrical closing disk, a closing cylinder, or a cylinder (420) with attached truncated-cone-shaped closing segment (410).

In some embodiments, the valve (100) is a continuously acting regulating valve (100), in particular in a temperature control loop or in a temperature control system, in particular with a magnetic drive unit (102), an electromechanical drive unit (102), or an electrohydraulic drive unit (102), or a pneumatic drive unit (102), wherein in the case of a magnetic drive unit (102) an electronic activation device (102) converts a positioning signal into a phase-cut power signal (103), which builds up a magnetic field in a magnet coil of the drive unit, and wherein the lift resolution of the regulating valve (100) is greater than 1:100, greater than 1:500, or greater than 1:900.

BRIEF DESCRIPTION OF THE DRAWINGS

Further advantages, technical effects, features, and details of the teachings herein and of developments arise from the description below in which an exemplary embodiment is described in detail by making reference to the drawing, in which, in schematic form.

DETAILED DESCRIPTION

Figure 1:
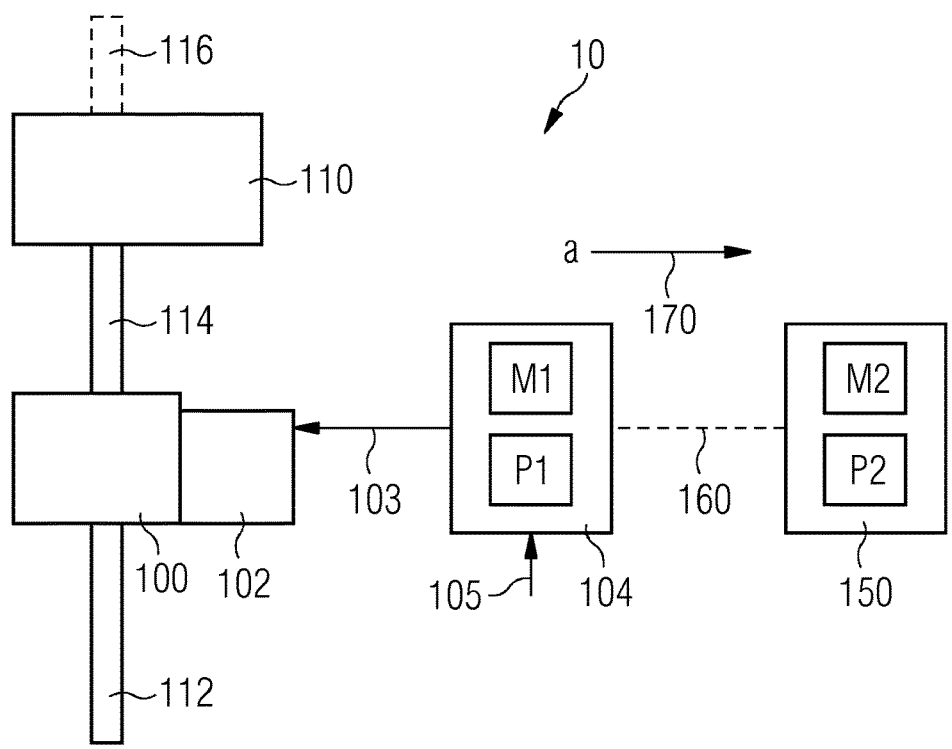
FIG. 1 shows a building-related infrastructure incorporating teachings of the present disclosure.

Some embodiments of the teachings herein include a method for operating a valve, in particular with an electronically activated drive unit containing the steps:
specifying a nonlinear characteristic curve function, which indicates a required relationship between a valve opening position and the flow of a fluid through the valve,
storing the characteristic curve function in an electronic control unit, for example in a control unit of the valve or in a central or respectively higher-level control unit/regulating unit of such a control unit, and
using the stored characteristic curve function to set the valve opening position of the valve depending on a control signal, which indicates a target flow through the valve.

In some embodiments, the characteristic curve function is calculated automatically by means of a parameter value that is specified by a user of the valve. In some embodiments, the user can specify an analytic function or supporting values, from which an analytic function can be determined by means of interpolation. The user therefore specifies only the parameter value and does not need to have any knowledge of the mathematical relationships for determining the characteristic curve. In some embodiments, the user specifies the analytic function or the supporting values. Simple mathematical knowledge is sufficient for this. Specification of the parameter, of the analytic function, or of the supporting values produces new degrees of freedom for definition, by the user, of valve characteristic curves that can be selected as required.

In some embodiments, during specification of the analytic function by the valve user, the said user can for example input, or specify respectively, individual function terms of the analytic function preferably one after another, e.g. by way of a corresponding user interface, like a user interface implemented on an electronic display unit with the aid of software. The function terms can contain in particular one of the basic mathematical operators, i.e. add, subtract, multiply or divide. The user could then input at least one of the following characters: +, −, *, or /. The function terms can be input unambiguously and correctly with the aid of brackets. Thus round brackets "(" and ")" or square brackets "[", "]" can be input or specified respectively by the user.

In some embodiments, during specification of supporting values, the supporting values can be input by the user singly, for example in sequence, with just one y-value or function value respectively being input in each case. In some embodiments, pairs of supporting values can also be specified, which consist of a first value, e.g. x-value or definition value, and a second value, e.g. y-value or function value. A user interface can be provided for input of function values, e.g. a user interface implemented on an electronic display unit with the aid of software.

Specifying a nonlinear characteristic curve function makes it possible for the valve to be constructed simply and, for example, to have a linear or approximately linear characteristic curve. Nevertheless, by suitable specification of the nonlinear characteristic curve function in the case of a nonlinear characteristic curve, in particular a heat-related load, an overall characteristic curve for the system consisting of load and valve can be linearized, as explained in detail below using the example of a heat exchanger.

In some embodiments, the characteristic curve function can be present in the form of a calculation instruction, or sequence of values or table of values respectively, i.e. a so-called 'look-up table'. The entire course of the characteristic curve is influenced by the parameter that the user specifies. In some embodiments, all the values to be stored for the characteristic curve function are calculated by using the parameter. Intermediate values can be calculated subsequently by way of spline functions or similar functions, including by linear approximation in the simplest case.

The method can be carried out for a line segment in a regulating system or control system respectively, in which valve and load are connected in series. If there are multiple line segments, then the method can be executed separately for each relevant line segment.

In some embodiments, the fluid is a liquid, such as e.g. water in a heating circuit. However, the fluid can also be a gas.

The parameter value, or a parameter value of the analytic function, or a parameter value used for calculating the supporting values, can be a characteristic value for mathematical modeling of a characteristic curve, which is calculated while taking account of a characteristic curve for a heat exchanger, where preferably the characteristic curve for the heat exchanger can be calculated with the same parameter value. The characteristic curve can indicate for the heat exchanger the relationship between the heating power or cooling power and the flow of a liquid or a gas through the heat exchanger.

Heat exchangers are frequently designed specifically to characteristic values at the customer's request. For example, the parameter value can be calculated from the characteristic values of the heat exchanger, for example from maximum power, incoming temperature, and outgoing temperature. The heat exchanger can operate according to the counterflow principle or according to the parallel flow principle for example, which results in different characteristic curves and therefore in mutually differing parameter values.

Taking account of the characteristic curve for the heat-related load, i.e. of the heat exchanger for example, makes it possible to set very good regulating behavior in a control loop for temperature regulation. In some embodiments, this can be effected by linearization of the overall characteristic curve and/or by achieving a constant loop gain.

The characteristic curve function can be an inverse function, which is determined from a characteristic curve for a heat exchanger and a target function. The characteristic curve for the heat exchanger can indicate the relationship between the heating power or cooling power and the flow of a liquid or a gas through the heat exchanger. The target function can indicate the relationship between the heating power or cooling power of the heat exchanger depending on the valve opening position of the valve. Thus, the target function can preferably be a linear function. The characteristic curve for the heat exchanger can be calculated with the aid of the same parameter value as the specified or determined characteristic curve function. Calculation of the characteristic curve for the heat exchanger can be omitted where relevant in the context of carrying out the method since the said characteristic curve is implemented implicitly by the heat exchanger and only needs to be known once if the inverse function is defined.

In some embodiments, the inverse function is therefore a desired valve characteristic curve function, which is carried out by mapping positioning variable values for the valve by using an electronic control unit for a valve, or by using a central control unit. The linear target function enables a simple linear regulation for example, with steady constant control gain.

The valve can have a linear mechanical characteristic curve, where the valve may be a globe valve or a slide valve with a geometrically simply constructed valve tappet. The valve may be a simply constructed globe valve with a valve tappet in the form of a cylindrical closing disk, a closing cylinder, or a cylinder with an attached truncated-cone-shaped closing segment. In some embodiments, the mechanical characteristic curve is produced for example when the electronic control unit would not take account of any stored characteristic curve that differs from a characteristic curve specified by the mechanical constructional type of the valve.

In defining the inverse function, a nonlinear mechanical characteristic curve of the valve can be taken into account, where the valve is in particular a ball valve, a throttle valve, or a rotary globe valve. This allows linearization of the regulation, or control respectively, to be achieved for other valve types also.

In some embodiments, the characteristic curve function can be specified by the following calculation instruction:

$$v=q/(q+(1-q)/a),$$

where q is the normalized cooling power or heating power of the heat exchanger, in the range 0 to 1, and unit-less, where v is the normalized flow through the valve and through the heat exchanger, in the range 0 to 1, and unit-less, and where a indicates a characteristic value for modeling a characteristic curve for a, or respectively the, heat exchanger, which is defined in particular by the inflow temperature and the outflow temperature of the two fluids, e.g. water and air, where relevant also water and water, flowing through the heat exchanger, where a lies in the range 0 to 1, and is unit-less.

Other characteristic curve functions with differing calculation instructions can also be used, in particular more complex or more simple functions. The point of reference can be other heat-related loads or other technical loads, in place of the heat exchanger.

In some embodiments, the valve can be connected upstream or downstream of the heat exchanger.

In some embodiments, the valve can be a continuously acting regulating valve, in particular in a temperature control loop or in a temperature control system. The valve can contain a magnetic drive unit, an electromechanical drive unit, an electrohydraulic or hydraulic drive unit, an electropneumatic or pneumatic drive unit, or another type of drive unit. The electromechanical drive unit can contain a positioning motor with a gearing unit. An electronic control unit, in particular of a magnetic drive unit, can convert a positioning signal into a phase-cut power signal, which builds up a magnetic field in a magnet coil of the magnetic drive unit, so that reliable activation is produced. The lift resolution of the regulating valve can be greater than 1:100, greater than 1:500, or greater than 1:900, which for example justifies the effort for characteristic curve adaptation, by way of the resulting very good regulating properties. The lift resolution is calculated for example from the ratio of the smallest lift change to the total lift of the valve in the case of a globe valve. However other valve types can also be used. The positioning time for the valve can be less than 2 seconds or less than 1 second.

The characteristic curve function can be stored in an electronic device, e.g. in an electronic memory device, in particular in the form of a calculation instruction for an automatically executed program, or in the form of a table of values in which valve opening positions belonging to flow values, or flow values belonging to valve opening positions are stored, in particular normalized valve opening positions and normalized valve opening positions.

The characteristic curve can also be scaled where the externally specified working range of the valve can be less than 100 percent of the potential valve opening position of the valve, in particular can be less than 75 percent or less than 50 percent. The actual control value can be calculated for example from an externally specified control value, in which a percentage corresponding to the externally specified control value with reference to a mechanically possible maximum valve opening position is multiplied by a percentage corresponding to the externally specified control value with reference to a specified actually used maximum valve opening position. This is explained in detail below on the basis of FIG. 3. In this simple manner the dynamic range of the valve, and therefore of the control or regulation can be expanded.

The parameter can be specified by a user of the valve, in particular while utilizing an app that communicates with a server. The parameter can be sent from the server to the control unit by way of a download of the firmware of an electronic control unit for activating a drive unit of the valve, e.g. over a data transmission network. In this regard the firmware is, for example, a program that has been programmed for operating a specific technical apparatus. The firmware mostly activates input and output devices direct, i.e. without using an operating system, which would be suitable for activating hardware from various manufacturers. In some embodiments, another type of input facility is used for the parameter.

The method can be carried out, in particular automatically, at least two times per year or per day for the same valve with mutually differing parameter values. In some embodiments, a cooling of the heat exchanger in the Summer with a parameter a1 can be taken into account, and a heating of the heat exchanger in the Winter with a parameter a2. In some embodiments, a full-load heating in the Winter with a parameter a1 and part-load heating in the transition periods with a parameter a2 could be taken into account. Seasonal adaptations and even diurnal adaptations of the characteristic curve for the valve are therefore possible in simple fashion. An app can be used for the adaptations. In some embodiments, the adaptation is effected in another way, for example by means of programming.

Specification of the parameters can also be effected from a central or higher-level control unit, which activates multiple valves. At least one of the valves activated by this control unit can operate according to the method explained above with automatic adaptation of the characteristic curve.

In some embodiments, an electronic control unit has at least one memory unit, in which a program with commands for activating at least one valve is stored. The at least one processor is designed to load the program from the memory unit and process commands of the program. In this regard the control unit is designed to activate precisely one drive unit of a valve depending on a drive signal. In some embodiments, the control unit can be designed, in the form of a central or higher-level control unit, to activate multiple valves with the aid of multiple drive signals. The control unit can be suitable for carrying out the methods taught herein. 'Being suitable' means that units are present that carry out the associated method steps.

In some embodiments, a valve drive has a drive unit, in particular a magnetic drive unit, an electromechanical drive unit, an electrohydraulic drive unit, or a pneumatic drive unit.

Additionally, the valve drive has a control unit connected for signaling or data purposes to the drive unit. The components of the valve drive can be accommodated in a common housing. A current or voltage supply, at least for feeding electrical energy to the inventive control unit, can be accommodated in the housing for the valve drive. Depending on the implementation of the drive unit the current or voltage supply, a hydraulic pump, or also a pneumatic pump can be accommodated in the housing for the valve drive.

All the technical effects that have been described in detail above with reference to a method can therefore also be provided by the control unit, where a method is executed in the control unit. The same applies to the valve drive which incorporates a control unit as described herein.

In some embodiments, there is a valve tappet optimization with V characteristic curve or flow characteristic curve respectively, that is dynamically definable in firmware (FW). Currently the globe valve characteristic curve is determined in the form of complex tappet configurations. The development of these tappets is proving difficult and manufacture is very costly. Since the valve characteristic curve is permanently determined by the assembly of the valve and the tappet, there is no possibility of being able to alter them subsequently and without great cost. The valve characteristic curve was determined by a complex shape or bore-hole in the tappet.

In some embodiments, the tappet may no longer be a complex configuration, or respectively does not need to be so, but instead for example a simply manufactured, flat cylinder tappet. This tappet can then be used in all valves irrespective of the desired valve characteristic curve and can be combined with a drive unit with suitable lift resolution.

Not only can substantial savings in costs be made on the tappet side, for development and/or production for example, but also the valve characteristic curve can be adapted as required and changed dynamically in the installed base. There is furthermore the option of scaling the characteristic curve in the case of a working range of the valve lift smaller than 100 percent. Dynamic adaptation of the characteristic curve can be effected by way of a download of the firmware or in another suitable manner.

A geometrically complex closing body can therefore be replaced by a 'simple' closing body. A desired flow characteristic can be generated by way of interpolation of support points or by way of mathematical functions in the control unit as part of a valve drive or positioning drive of the valve respectively. A corresponding resolution of the positioner can be appropriate.

An additional feature could be the input of an "a" value to be compensated, for example of a characteristic value for a heat exchanger characteristic curve. Then the user does not need to first derive a valve characteristic curve from the heat exchanger characteristic curve or another type of load characteristic curve and then input same. This task can be taken over by the valve drive or by the positioning drive of the valve respectively.

The mathematical approximation of the heat exchanger characteristic curve can be as follows:

$$q=v/(v+(1-v)*a)$$

where q: relative power (0 . . . 1),
v: relative flow, and
a: heat exchanger characteristic value (determined unambiguously by way of the design temperatures).

The mathematical approximation of the inverse function can be as follows:

$$v=q/(q+(1-q)/a)$$

where q: relative power (0 . . . 1),
v: relative flow, and
a: heat exchanger characteristic value (determined unambiguously by way of the design temperatures).

This can be the basis for correction of the inherent internal characteristic of regulation or control, which does not need to be known to the user at all.

Changing the characteristic, in particular the valve characteristic can be effected for example by using the BacNet (Building Automation and Control Networks) standards, e.g. with a mobile app.

FIG. 1 shows a building-related infrastructure 10, containing the following units:
a valve 100,
a drive unit 102 of the valve 100, for example a magnetic drive unit, an electromechanical drive unit, e.g. a motor with a gearing unit, or an electrohydraulic drive unit,
a control unit 104, which activates the drive unit 102, and
a heat exchanger 110, which is connected in series to the valve 100, by way of the line segments 112 to 116, for example by way of heating pipes.

The reference character 1000 designates a valve drive, which can be attached to the valve 100 as a module for setting a valve lift. Such a valve drive 1000 can also be designated as a positioning drive. In some embodiments, valve drive 1000 comprises a drive unit 102 incorporated in a housing, and also a control unit 104 with a signaling and/or data link to the drive unit 102. A voltage or current supply for supplying the drive unit 102 with energy can also be incorporated in the housing of the valve drive 1000.

The control unit 104 generates, for example, a phase-cut power signal 103 in the case of a magnetic drive unit 102. In some embodiments, a different type of drive signal can be generated.

The control unit 104 receives a control signal 105 from a higher-level control unit or regulating unit, which specifies a positioning value for the valve 100. For example, the control signal 105 is a voltage signal in the range 0 volts to 10 volts for example, or a current signal in the range 0 milliamps to 20 milliamps for example. The ranges can also start at a different value than 0 volts or 0 milliamps, for example at 2 volts or at 4 milliamps. The control unit 104 can be implemented purely in the form of hardware or circuit respectively. In some embodiments, the control unit 104 can contain a data memory M1 for program data and working data, and also a processor P1 that processes program commands stored in the memory M1 while executing the method steps explained below.

An implementation is explained below in which the method, including characteristic curve specification, is carried out primarily in the control unit 104. In some embodiments, the method can also be carried out in the same or similar manner in the higher-level control unit or regulating unit.

The building-related infrastructure 10 includes also, in the wider sense, a server 150, e.g. an electronic data processing system, on which at least one service-providing program is stored. The server 150 can contain a data memory M2 for program data and working data, and also a processor P2 that processes program commands stored in the memory M2 while executing the method steps explained below. In some embodiments, the server 150 can also be implemented just by using hardware or circuitry respectively.

The control unit 104 and the server 150 can be connected by way of a data transmission network 160, for example via the Internet or via a corporate network that operates in accordance with Internet protocol IP for example.

The method for operating the valve 100 is explained in detail below. An inverse function, see FIG. 2, inverse function 230, is stored in the control unit 104 or in the higher-level control system. As shown by an arrow 170, a utilizer or user of the valve 100 can specify a parameter a, which is explained in further detail below. The specifying can be done by way of a service-using program for example, referred to as app for short, which works together with a corresponding service-providing program on the server 150. For example the parameter "a" can be transmitted to the server 150 by way of the data transmission network 160 or another type of data transmission network. In some embodiments, the user can also specify multiple parameters a1, a2 etc. and additionally, where appropriate, also times at which the said parameters are to be used in each case, for example months, days, or even hours.

The parameter a is then taken into account in the inverse function 230, for example by storage in firmware by way of a calculation instruction for the characteristic curve 230, or by the storage of values that have been calculated by using the parameter a, in accordance with the calculation instruction, by the service-providing program or by another type of program to which the parameter a has been transferred by the service-providing program with which the user communicates.

Once the firmware has taken account of the parameter a, the firmware in the control unit is updated, for example by way of a download. In some embodiments, the parameter a can also be input directly into the control unit 104 or the higher-level control unit. The firmware is then correspondingly adapted and can take variable parameters a into account itself. In some embodiments, the higher-level control system can update the firmware.

Figure 2:
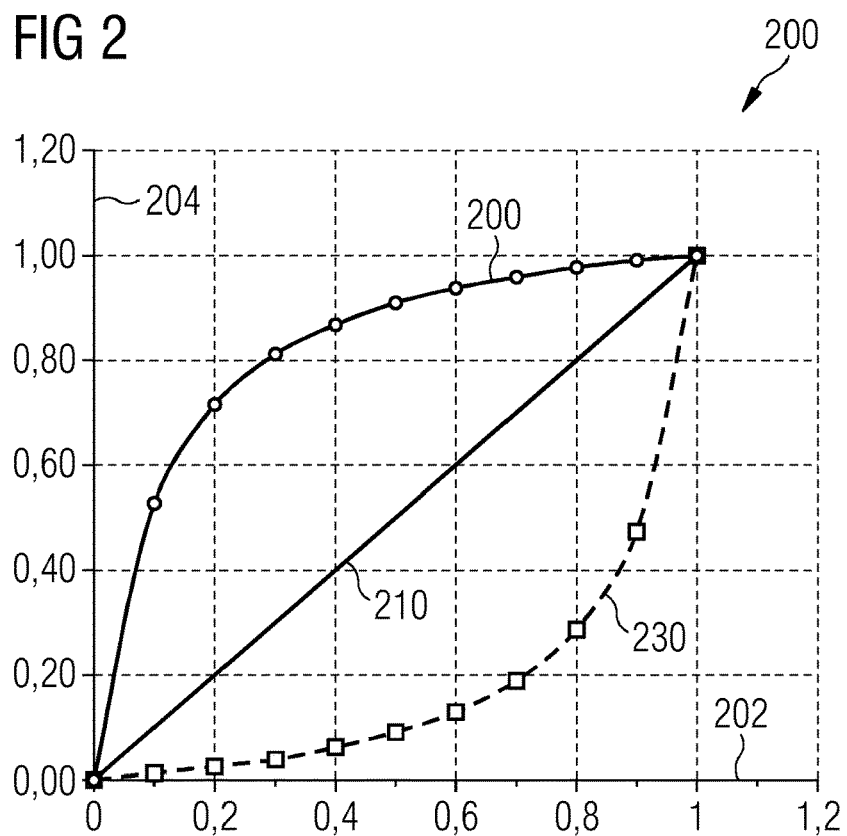
FIG. 2 shows a load characteristic curve, a valve characteristic curve determined from the load characteristic curve, and an overall characteristic curve incorporating teachings of the present disclosure.

After this, the infrastructure 10 and in particular the valve 100 are operated by using the inverse function 230 calculated with the parameter a, see FIG. 2. By means of this procedure a simply constructed valve 100 can be used, the valve tappet of which is explained in further detail below on the basis of FIG. 4. In some embodiments, linearization of the overall characteristic function for the system comprising the valve 100 and heat exchanger 110, as explained below on the basis of FIG. 2, can be realized in a simple manner.

In place of specifying the parameter a, the entire characteristic load function or the inverse function respectively can also be specified by a utilizer or user of the valve 100. In some embodiments, support values for the said function or the said functions can be specified by a utilizer or user of the valve 100, from which the necessary function or necessary function values can then be calculated by means of interpolation.

FIG. 2 shows, in a coordinate system 200, a characteristic load curve 220 for the heat exchanger 110, a valve characteristic curve or inverse characteristic curve 230 for the valve 100 as determined from the load characteristic curve, and an overall characteristic curve 210 (target function) for the overall system comprising the valve 100 and heat exchanger 110.

The coordinate system 200 has an x-axis 202 on which the flow through the heat exchanger 110 for the characteristic curve 220 is shown in normalized form in the range 0 to 1. Regarding the valve 100, the x-axis 202 shows the lift in normalized form, and in the range 0 to 1. Normalization can be effected to maximum values for the lift, the flow, or the power.

The y-axis 204 of the coordinate system 200 shows, for the heat exchanger 110, the heat exchange power, for example a heating power or a cooling power, again normalized and in the range 0 to 1. Regarding the valve, the y-axis 204 shows the flow, in particular normalized in and the range 0 to 1. Due to the valve 100 and heat exchanger 110 being connected in series, the flow of the fluid, in particular water, is the same through both units, which renders the representation in a coordinate system 200 meaningful.

Regarding the overall characteristic 210 of the overall system comprising the valve 100 and heat exchanger 110, the x-axis shows the normalized flow through the valve 100 or through the heat exchanger 110 the range 0 to 1, and the y-axis the normalized power of the heat exchanger 110 in the range 0 to 1.

The inverse function 230 is defined on the basis of the characteristic curve 220 such that a linear or approximately linear overall characteristic curve 210 is produced. This can be done graphically by using calculation instructions or formulas as explained in further detail below, or in another suitable manner.

The characteristic curve for the heat exchanger 220 was calculated according to the following formula for example:

$$q=v/(v+(1-v)*a))$$

where q is the normalized cooling power or heating power of the heat exchanger 110, preferably in the range 0 to 1, and preferably unit-less, where v is the normalized flow through the valve 100 and through the heat exchanger 110, preferably in the range 0 to 1, and preferably unit-less, and where a indicates a characteristic value for the modeling of a characteristic curve for the heat exchanger 110, which is defined in particular by the incoming temperature and the outgoing temperature of a fluid flowing through the heat exchanger 110, where a lies in the range 0 to 1, and is preferably unit-less.

The inverse function 230 is determined from the characteristic curve 220 in that, in the case of a linear characteristic curve of the valve 100, a characteristic curve without specification of a separate characteristic curve for the valve 100, a mirroring of the characteristic curve 220 is carried out with respect to the target characteristic curve 210, or target function respectively, for example by graphic means or by calculation with an mathematical program.

In the example the profile/characteristic function of the inverse function 230 or the characteristic curve function 230 is produced by:

$$v=q/(q+(1-q)/a)$$

where q is the normalized cooling power or heating power of the heat exchanger 110, preferably in the range 0 to 1, and preferably unit-less, where v is the normalized flow through the valve 100 and through the heat exchanger 110, in the range 0 to 1, and unit-less, and where a indicates a characteristic value for the modeling of a characteristic curve for the heat exchanger 110, which is defined in particular by the incoming temperature and the outgoing temperature of a fluid flowing through the heat exchanger 110, where a lies in the range 0 to 1, and is unit-less.

Both characteristic curves 220 and 230 are therefore based on the same parameter a. The characteristic curve 230 can be placed or stored respectively in the firmware of the control unit 104 for concrete parameters a or in the form of a general calculation instruction.

If concrete values are determined from the characteristic curves 230 and 220, then the characteristic curve 210 is produced. For example, a lift of 0.8 in accordance with characteristic curve 230 corresponds to a flow through the valve 100 of around 0.3 on the y-axis. At a flow of 0.3 on the x-axis for the heat exchanger 110 a heat exchanger power of around 0.8 is produced on the y-axis with the characteristic curve 220. Therefore, the lift value 0.8 corresponds to the power value 0.8 for the overall characteristic curve 210.

A linear characteristic curve was assumed for the valve 100 in defining the characteristic curve 230. It is also possible, however, to take into account mildly nonlinear or strongly nonlinear characteristic curves that diverge from same for valves of specific constructional forms.

Figure 3:
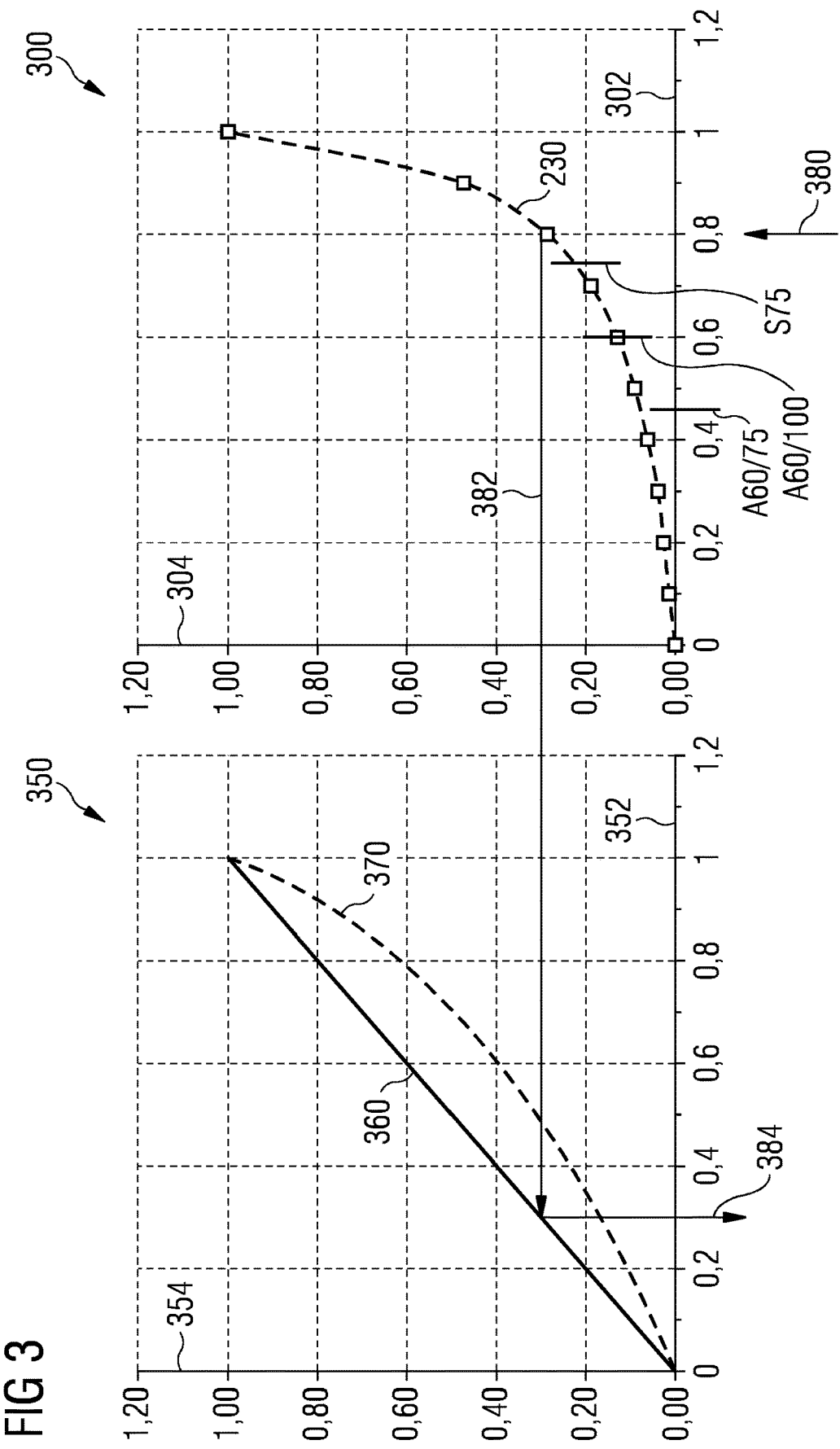
FIG. 3 shows the process of mapping an external valve positioning variable onto an internal valve positioning variable, and also an example of scaling, incorporating teachings of the present disclosure.

FIG. 3 shows the operation of mapping an external valve positioning variable of the valve 100 onto an internal valve positioning variable and an example of scaling. A coordinate system 300 shows the inverse function 230. The x-axis 302 of the coordinate system 300 indicates the normalized lift of the valve 100 in the range 0 to 1 for the inverse function 230. The y-axis 304 of the coordinate system 300 indicates the normalized flow through the valve 100 in the range 0 to 1. Normalization can be effected to maximum values for the lift or the flow respectively.

A coordinate system 350 displayed to the left alongside the coordinate system 300 shows the linear valve characteristic curve 360 of the valve 100, which it has required due to its construction, if the control unit and also the higher-level unit do not make any corrections to the characteristic curve. The valve characteristic curve 360 of the valve is linear in the example. In other examples the valve characteristic curve of the valve 100 is nonlinear even in the absence of corrections, see characteristic curve 370 for example. The characteristic curve 370 is then taken into account in place of the characteristic curve 360 in defining the inverse function such that the target function 210, see FIG. 2, is once again linear or has another type of desired or required profile.

The x-axis 352 of the coordinate system 350 designates, for the valve characteristic curve 360 or 370 respectively, the normalized lift of the valve 100 in the range 0 to 1. The y-axis 354 of the coordinate system 350 designates the normalized flow through the valve 100 in the range 0 to 1. Normalization can be effected to maximum values for the lift or the flow respectively.

To realize the characteristic curve 230, the inverse function, the control unit 104 carries out mapping of external positioning values (control signal 105) onto the valve's internal positioning values (drive signal 103), which is explained below for a given value. For example, if the normalized external positioning value (control signal 105) for the lift of the valve is 0.8, then the control unit determines, with the aid of the characteristic curve 230 stored in the control unit 104, the flow value of around 0.3, see arrow 380 and 382. With this flow value 0.3 the control unit 104 then determines an associated lift value of the valve 100 from characteristic curve 360. The characteristic curve 360 can likewise be stored in the control unit. For a flow of 0.3 a lift of likewise 0.3 follows from the characteristic curve 360, which is then used as a value to be set at the valve 100, i.e. must be realized in the signal 103, see arrow 384. In the case of a linear characteristic curve 360 the control unit can also use the flow value on the x-axis 304 direct as a value for the lift. The mapping function with reference to the coordinate system 350 only needs to be carried out in the case of a nonlinear valve characteristic curve 370.

An example of scaling is plotted in FIG. 3. In the case of the valve characteristic curve 230 the maximum positioning value in the line segment 112 to 116 is for example only 75 percent, for which the reference character S75 is used. A control signal of 60 percent generated by the external control unit does not then produce an opening of the valve corresponding to the characteristic curve at the position A60/100, i.e. 60 percent, but instead the flow value is given at the position A60/75, which is produced as percent of an activation range specified by the maximum positioning value of 75 percent, that is to say at a positioning signal of 45 percent, or respectively 60 percent multiplied by 75 percent (0.6× 0.75=0.45).

The mapping of positioning values and the scaling can also be carried out in combination.

Figure 4:
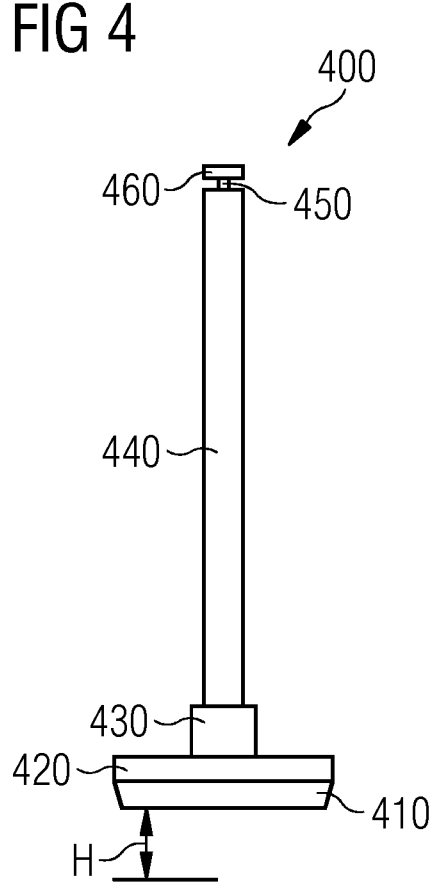
FIG. 4 shows a valve insert.

FIG. 4 shows a valve insert 400 of the valve 100. The valve insert 400 contains, from bottom to top in the following sequence:

a truncated-cone-shaped tappet segment 410,
a cylindrical tappet segment 420,
a shaft neck 430, the diameter of which has a value that is smaller than the diameter of the tappet segment 420,
a shaft 440, which is long compared to the shaft neck 430 and also to the tappet segment 420, the diameter of which is smaller than the diameter of the shaft neck 430,
a fixing segment 450, which is short compared to the length of the shaft 440, the diameter of which is smaller than the diameter of the shaft 440 and that for fixing a valve drive 1000 or a positioning drive of the valve 100 for example, and
an end segment 460, which is short compared to the length of the shaft 440, the diameter of which is larger than the diameter of the fixing segment 450.

A valve lift H lies between an opening position of the base of the truncated-cone-shaped tappet segment 410 and a valve opening, not shown, of the valve 100. The valve insert 400 is therefore simply constructed and can be manufactured at low cost. With no additional measures the valve insert 400 produces a linear characteristic curve 360. By means of the control unit 104 or a higher-level control unit/regulating unit however, any characteristic curve can be realized with the valve 100 while using the valve insert 400, by proceeding as explained above.

LIST OF REFERENCE CHARACTERS

10 Building-related infrastructure
100 Valve
102 Drive unit
103 Drive signal
104 Control unit
105 Control signal
110 Heat exchanger
112 to 116 Line segment
150 Server
160 Data transmission network
170 Parameter transmission
M1, M2 Data memory
P1, P2 Processor
a Heat-related parameter
200, 300, 350 Coordinate system
202, 302, 352 x-axis
204, 304, 354 y-axis
210 Overall characteristic curve
220 Characteristic curve for heat exchanger
230 Profile/characteristic curve of inverse function
360 Linear valve characteristic curve
370 Nonlinear valve characteristic curve
380 to 384 Arrow for value mapping
S75 Positioning value
A60/100 External positioning value
A75/100 Internal positioning value
400 Valve insert
410 Truncated-cone-shaped tappet segment
420 Cylindrical tappet segment
430 Shaft neck
440 Shaft
450 Fixing segment
460 End segment
1000 Valve drive, positioning drive
H Valve lift

What is claimed is:

1. A method for operating a valve the method comprising:
determining or specifying a nonlinear characteristic curve function indicating a required relationship between a valve opening position and flow of a fluid through the valve;
storing the characteristic curve function in an electronic control unit;
utilizing the stored characteristic curve function to set the valve opening position depending on a control signal indicating a target flow through the valve, wherein the characteristic curve function is calculated automatically using a parameter value, with an analytic function or by interpolation with specified supporting values specified by a user of the valve;
wherein the characteristic curve function comprises an inverse function based on a characteristic curve for a heat exchanger and a target function;
the characteristic curve for the heat exchanger indicates a relationship between a heating power or a cooling power and the flow of a fluid through the heat exchanger;
the target function indicates a relationship between the heating power or the cooling power of the heat exchanger based on the valve opening position;
and
the characteristic curve for the heat exchanger depends on the same parameter value as the specified or determined characteristic curve function.

2. The method as claimed in claim 1, wherein:
a definition of the inverse function depends on a nonlinear mechanical characteristic curve of the valve;
the valve comprises a ball valve, a throttle valve, or a rotary globe valve.

3. The method as claimed in claim 1, wherein:

the characteristic curve function is specified by—$v=q/(q+(1-q)/a)$, q is the normalized cooling power or heating power of the heat exchanger, in the range 0 to 1;

v is the normalized flow through the valve and through the heat exchanger, in the range 0 to 1; and a indicates a characteristic value for modeling a characteristic curve for the heat exchanger defined by an inflow temperature and an outflow temperature of a fluid flowing through the heat exchanger, wherein a lies in the range 0 to 1.

4. The method as claimed in claim 1, wherein— the characteristic curve function is stored in an electronic memory device in the form of a calculation instruction for an automatically executed program or in the form of a table of values in which valve opening positions belonging to flow values or flow values belonging to valve opening positions are stored.

5. The method as claimed in claim 1, wherein:

the characteristic curve is scaled, wherein the externally specified working range of the valve is less than 100 percent of the potential valve opening position of the valve;

the actual control value is calculated from an externally specified control value in which a percentage corresponding to the externally specified control value with reference to a mechanically possible maximum valve opening position is multiplied by a percentage corresponding to the externally specified control value with reference to a specified actually used maximum valve opening position.

6. The method as claimed in claim 1, wherein:

the parameter is specified by a user of the valve by utilizing an app that communicates with a server;

wherein the parameter is sent from the server to the control unit in a download of firmware of an electronic control unit for activating a drive unit of the valve.

7. The method as claimed in claim 1, wherein the method is carried out at least two times per year for the same valve with mutually differing parameter values.

8. An electronic control unit comprising:

a memory unit storing a program with commands for activating a valve;

a processor configured to load the program from the memory unit and process commands of the program, wherein the program causes the control unit to activate precisely one drive unit of a valve using a control signal, or to activate multiple valves using multiple control signals;

wherein the program causes the control unit to:

determine or specify a nonlinear characteristic curve function indicating a required relationship between a valve opening position and flow of a fluid through the valve;

store the characteristic curve function in an electronic control unit;

utilize the stored characteristic curve function to set the valve opening position depending on a control signal indicating a target flow through the valve, wherein the characteristic curve function is calculated automatically using a parameter value, with an analytic function or by interpolation with specified supporting values specified by a user of the valve;

wherein the characteristic curve function comprises an inverse function based on a characteristic curve for a heat exchanger and a target function;

the characteristic curve for the heat exchanger indicates a relationship between a heating power or a cooling power and the flow of a fluid through the heat exchanger;

the target function indicates a relationship between the heating power or the cooling power of the heat exchanger based on the valve opening position; and the characteristic curve for the heat exchanger depends on the same parameter value as the specified or determined characteristic curve function.

9. A valve drive for fitting to a valve for the purpose of setting a valve lift, the valve drive comprising a drive unit; and a control unit connected for signaling or data purposes to the drive unit as claimed in claim 8.

10. The valve drive as claimed in claim 9, wherein:

the valve has a linear mechanical characteristic curve;

the valve comprises a globe valve or a slide valve with a valve tappet of geometrically simple construction.

11. The valve drive as claimed in claim 9, wherein:

the valve comprises a continuously acting regulating valve in a temperature control loop or in a temperature control system; and an electronic activation device converts a positioning signal into a phase-cut power signal which builds up a magnetic field in a magnet coil of the drive unit, and the lift resolution of the regulating valve is greater than 1:100.

* * * * *